(12) United States Patent
Kim et al.

(10) Patent No.: US 12,630,126 B2
(45) Date of Patent: May 19, 2026

(54) PEDAL SIMULATOR

(71) Applicant: HL MANDO CORPORATION, Pyeongtaek-si (KR)

(72) Inventors: Heejun Kim, Pyeongtaek-si (KR); Hyundong Kim, Pyeongtaek-si (KR); Sungjun Hong, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/953,910

(22) Filed: Nov. 20, 2024

(65) Prior Publication Data

US 2026/0001515 A1 Jan. 1, 2026

(30) Foreign Application Priority Data

Jun. 26, 2024 (KR) ......................... 10-2024-0083797

(51) Int. Cl.
B60T 7/06 (2006.01)
B60T 13/74 (2006.01)

(52) U.S. Cl.
CPC .............. B60T 7/06 (2013.01); B60T 13/745 (2013.01)

(58) Field of Classification Search
None
See application file for complete search history.

(56) References Cited

U.S. PATENT DOCUMENTS

| | | | | |
|---|---|---|---|---|
| 2014/0117602 A1* | 5/2014 | Jeon | ........................ | B60T 11/18 |
| | | | | 267/170 |
| 2019/0145475 A1* | 5/2019 | Yamauchi | ............... | F16D 65/18 |
| | | | | 188/72.8 |
| 2022/0332296 A1* | 10/2022 | Eriksen | ..................... | B60T 7/04 |

* cited by examiner

*Primary Examiner* — Vicky A Johnson
(74) *Attorney, Agent, or Firm* — Seed Intellectual Property Law Group LLP

(57) ABSTRACT

A pedal simulator is disclosed. A pedal simulator according to an aspect of the present disclosure may include a housing; a piston, at least a front portion of which is arranged inside the housing and connected to a pedal of a vehicle, and moving forward or backward according to the movement of the pedal; a reaction force member arranged inside the housing to be compressed in accordance with the forward movement of the piston and providing a reaction force to the forward movement of the piston; and a friction member supported by the housing to provide frictional force between itself and the piston when the piston moves forward or backward.

20 Claims, 14 Drawing Sheets

110 : 111, 113
130 : 131, 132

110

111c

111d

111b 111 113

150

151 : 1511, 1513, 1514, 1515

150 : 151, 153, 154
151 : 1511, 1513, 1514, 1515

170

171

172b

172a

172 : 172a, 172b

PEDAL SIMULATOR

CROSS-REFERENCE TO RELATED APPLICATION

This application claims priority to and the benefit of Korean Patent Application No. 10-2024-0083797, filed Jun. 26, 2024, the disclosure of which is incorporated herein by reference in its entirety.

BACKGROUND

Technical Field

The present disclosure relates to a pedal simulator, and more particularly, to a pedal simulator that provides a reaction force for the operation of a pedal of a vehicle.

Description of Related Art

A pedal simulator may be mounted to a vehicle to form a corresponding reaction force, that is, a pedal effort, when the driver presses the pedal. For example, the pedal simulator may be mounted to a brake system of the vehicle to provide a reaction force against the operation of the brake pedal.

In order to reduce noise and improve operability, conventional pedal simulators adopt a structure in which a dry-bush with low frictional force is arranged in the area where the piston reciprocates. Accordingly, the reaction force against the operation of the pedal depends only on the damper, the spring, etc.

In addition, conventional pedal simulators show linear reaction force increase characteristics, causing the driver to feel a sense that is somewhat different from the pedal operation. Meanwhile, there is also a problem that even when the driver releases the pedal effort, the driver's fatigue is increased by receiving the same resistance as when applying the pedal effort.

There is a need to develop a technology that can improve the driver's pedal feeling and reduce fatigue by overcoming the structural limitations of conventional pedal simulators and increasing hysteresis.

BRIEF SUMMARY

The present disclosure is to solve the above problems, and the present disclosure is directed to providing a pedal simulator that enables a natural and stable pedal feeling according to the operation of a pedal.

The present disclosure is also directed to providing a pedal simulator that improves pedal feeling and reduces driver fatigue by following a different change path for the reaction force provided to the driver when pedal effort is applied to the pedal and when the pedal effort applied to the pedal is released.

The objects of the present disclosure are not limited to the above-described objects, and other objects that are not mentioned will be able to be clearly understood by those skilled in the art to which the present disclosure pertains from the following description.

According to an aspect of the present disclosure, provided is a pedal simulator including a housing; a piston, at least a front portion of which is arranged inside the housing and connected to a pedal of a vehicle, and moving forward or backward according to the movement of the pedal; a reaction force member arranged inside the housing to be compressed in accordance with the forward movement of the piston and providing a reaction force to the forward movement of the piston; and a friction member supported by the housing to provide frictional force between itself and the piston when the piston moves forward or backward.

In this case, the friction member may be formed to surround an outer circumferential surface of the piston, at least a portion of the friction member being in contact with the outer circumferential surface of the piston.

In this case, the housing may include a housing body in which a guide through hole through which the piston penetrates and is disposed, and the friction member may include a friction member body formed to be arranged inside the guide through hole, at least a portion of the friction member body being in contact with the outer circumferential surface of the piston.

In this case, the friction member body may include a first body part arranged in a front region of the guide through hole and having a ring shape surrounding the piston; a second body part arranged in a rear region of the guide through hole and having a ring shape surrounding the piston; and a contact body part extending in the front-rear direction between the first body part and the second body part and configured to generate frictional force by contacting at least a portion thereof with an outer surface of the piston.

In this case, the contact body part may have a leaf spring structure concave in the central axis direction of the piston.

Meanwhile, the contact body part may be provided in the plural number, and each of the plurality of contact body part may be spaced apart from each other in the circumferential direction of the piston.

Meanwhile, the friction member body may further include a third body part arranged between the first body part and the second body part and having a ring shape surrounding the piston, and the contact body part may extend in the front-rear direction between the first body part and the third body part and between the second body part and the third body part, and at least a portion of the contact body part may be in contact with an outer circumferential surface of the piston.

Meanwhile, the friction member may further include a first flange that is formed to extend at a front side of the friction member body, and is caught and supported by a periphery of a front inlet of the guide through hole; and a second flange that is formed to extend at a rear side of the friction member body, and is caught and supported by a periphery of a rear inlet of the guide through hole.

In this case, the first flange and the second flange may be formed to cross each other at a predetermined angle with respect to the extension direction of the friction member body.

Meanwhile, a first space communicating with the guide through hole and arranged in front of the guide through hole may be formed in the housing body, and the reaction force member may be arranged in the first space.

In this case, the piston may include a piston head in contact with the reaction force member and arranged in the first space; and a piston body connected to the piston head and arranged through the guide through hole.

Meanwhile, the pedal simulator may further include a first additional reaction force member arranged to overlap the reaction force member to provide resistance force when the piston moves forward.

Meanwhile, the pedal simulator may further include a second additional reaction force member arranged to overlap a portion of the piston to provide resistance force when the piston moves forward.

In this case, a front end of the second additional reaction force member may be supported by a rear side of the housing body, and a rear end of the second additional reaction force member may be supported by one side of the input shaft.

According to another aspect of the present disclosure, a pedal simulator configured to provide pedal effort to a pedal of a vehicle may be provided, the pedal simulator including a housing; a piston, at least a front portion of which is arranged inside the housing and connected to a pedal of a vehicle, and moving forward or backward according to the movement of the pedal; and a friction member supported by the housing to provide frictional force between itself and the piston when the piston moves forward or backward.

In this case, the friction member may be formed to surround an outer circumferential surface of the piston, at least a portion of the friction member being in contact with the outer circumferential surface of the piston.

In this case, the housing may include a housing body in which a guide through hole through which the piston penetrates and is disposed, and the friction member may include a friction member body formed to be arranged inside the guide through hole, at least a portion of the friction member body being in contact with the outer circumferential surface of the piston.

In this case, the friction member body may include a first body part arranged in a front region of the guide through hole and having a ring shape surrounding the piston; a second body part arranged in a rear region of the guide through hole and having a ring shape surrounding the piston; and a contact body part extending in the front-rear direction between the first body part and the second body part and configured to generate frictional force by contacting at least a portion thereof with an outer surface of the piston.

In this case, the contact body part may have a leaf spring structure concave in the central axis direction of the piston.

Meanwhile, the contact body part may be provided in the plural number, and each of the plurality of contact body part may be spaced apart from each other in the circumferential direction of the piston.

BRIEF DESCRIPTION OF THE SEVERAL VIEWS OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Figure 1:
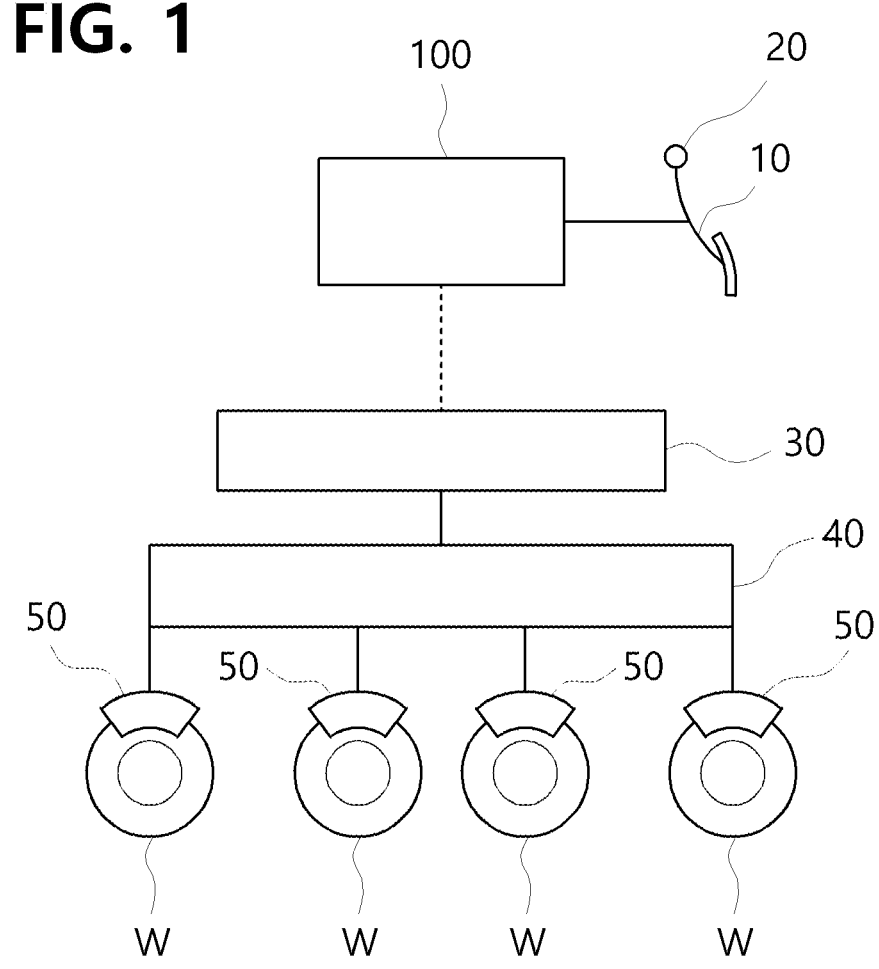
FIG. 1 is a diagram illustrating a configuration of a brake system of a vehicle to which a pedal simulator is mounted according to an exemplary embodiment of the present disclosure.

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used in the specification and the claims are not limitedly construed as their ordinary or dictionary meanings, and should be construed as meaning and concept consistent with the technical spirit of the present disclosure in accordance with the principle that the inventors can define terms and concepts in order to best describe their invention.

In the specification, it should be understood that the terms such as "comprise" or "have" are intended to specify the presence of features, numbers, steps, operations, components, parts, or combinations thereof described in the specification and do not preclude the possibility of the presence or addition of one or more other features, numbers, steps, operations, components, parts, or combinations thereof.

FIG. 1 is a diagram illustrating a configuration of a brake system of a vehicle to which a pedal simulator is mounted according to an exemplary embodiment of the present disclosure.

A pedal simulator 100 is mounted to a vehicle. The pedal simulator 100 provides a corresponding reaction force, that is, a pedal feeling, when the driver presses the pedal.

Referring to FIG. 1, the pedal simulator 100 may be mounted to a brake system of the vehicle. In more detail, the pedal simulator 100 may be mounted to the brake system of the vehicle to form a reaction force with respect to the operation of a brake pedal 10.

A displacement sensor 20 detects the displacement of the brake pedal 10. The displacement sensor 20 may detect an angle change, a displacement distance, and the like of the brake pedal 10. For example, the displacement sensor 20 may be an angle sensor that detects an angle of the brake pedal 10.

Displacement information of the brake pedal 10 detected by the displacement sensor 20 may be transmitted to a pump 30 generating braking hydraulic pressure. The pump 30 may generate braking hydraulic pressure corresponding to the displacement information.

The braking hydraulic pressure generated by the pump 30 may be supplied to a brake 50 mounted to a wheel W side of the vehicle through a hydraulic circuit 40 forming a hydraulic path between the pump 30 and the wheel W of the vehicle. The braking of the vehicle may be achieved by operating the brake 50 by the braking hydraulic pressure.

Hereinafter, the pedal simulator 100 according to an exemplary embodiment of the present disclosure will be described in detail.

Figure 2:
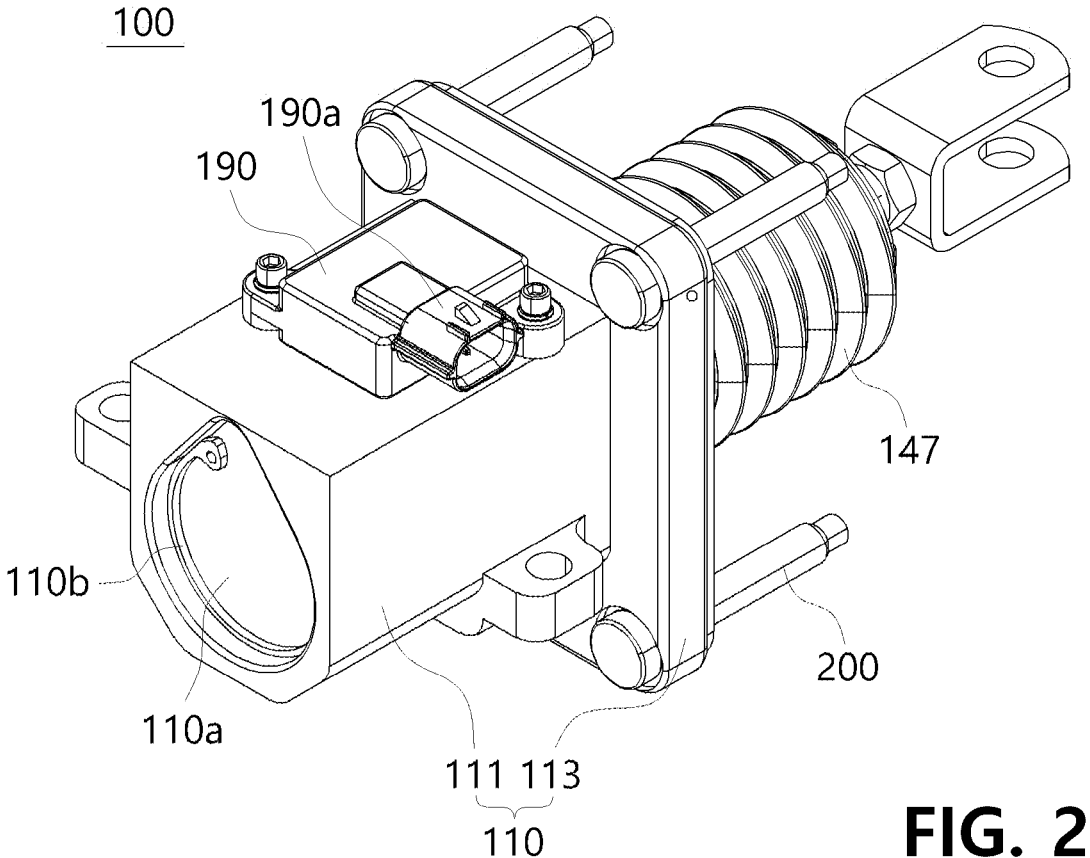
FIG. 2 is a perspective view of a pedal simulator according to an exemplary embodiment of the present disclosure.
Figure 3:
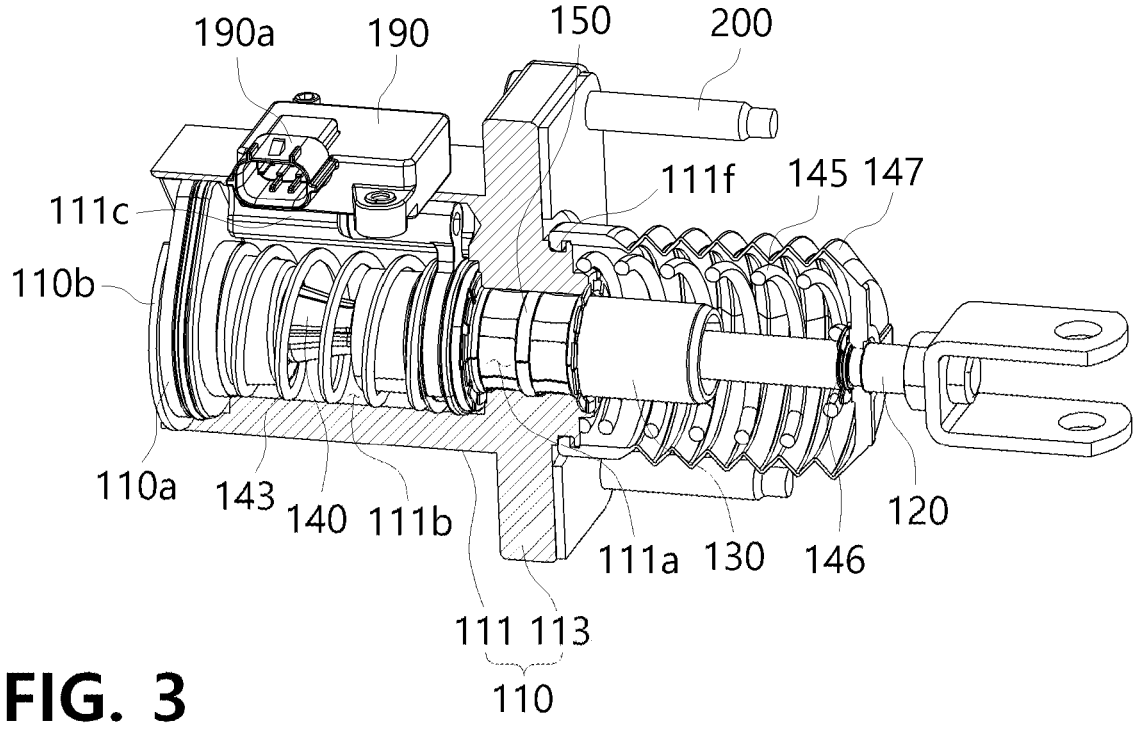
FIG. 3 is a perspective view of a pedal simulator according to an exemplary embodiment of the present disclosure with a longitudinal cross section of a housing cut away to expose it.
Figure 4:
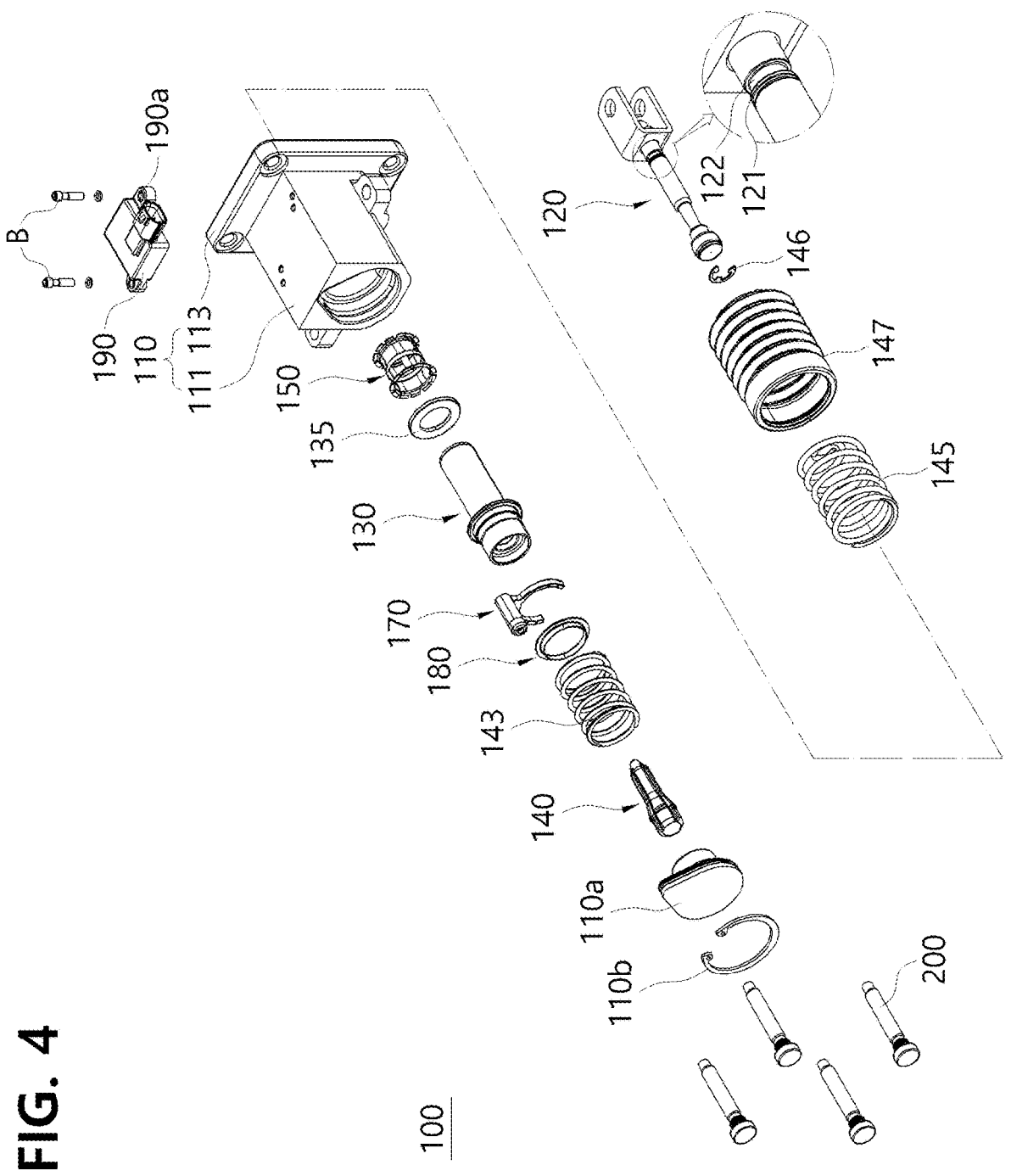
FIG. 4 is an exploded perspective view of a pedal simulator according to an exemplary embodiment of the present disclosure.
Figure 5:
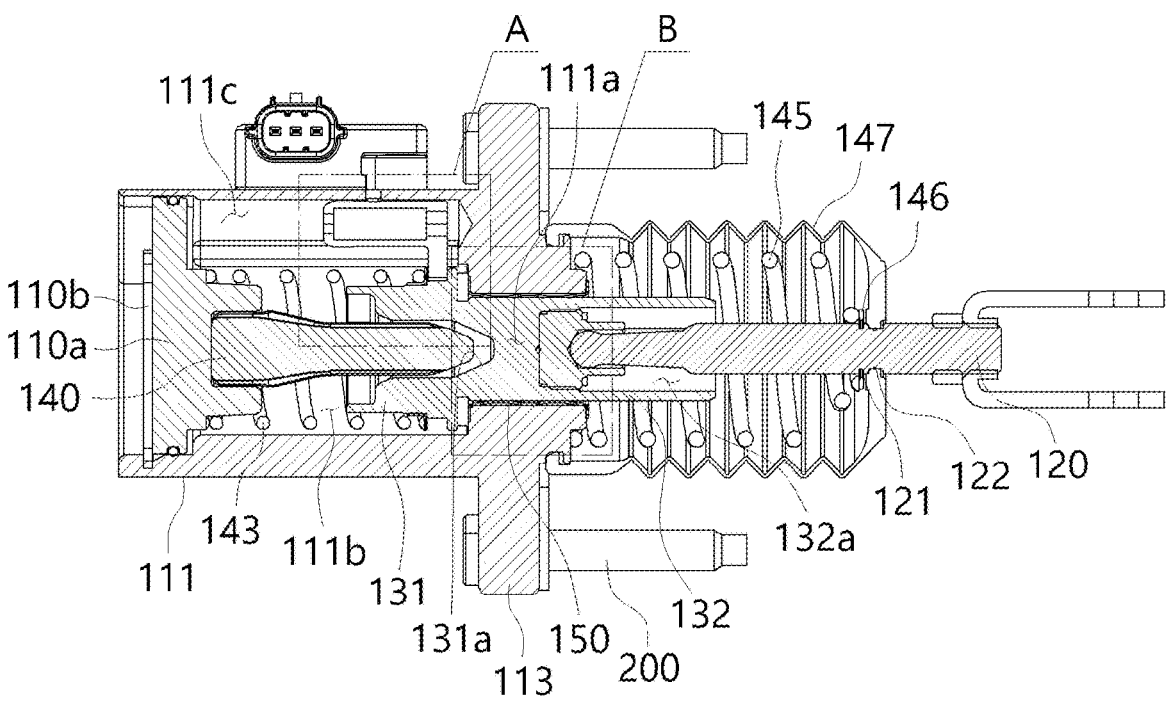
FIG. 5 is a longitudinal cross-sectional view of a pedal simulator according to an exemplary embodiment of the present disclosure.
Figure 6:
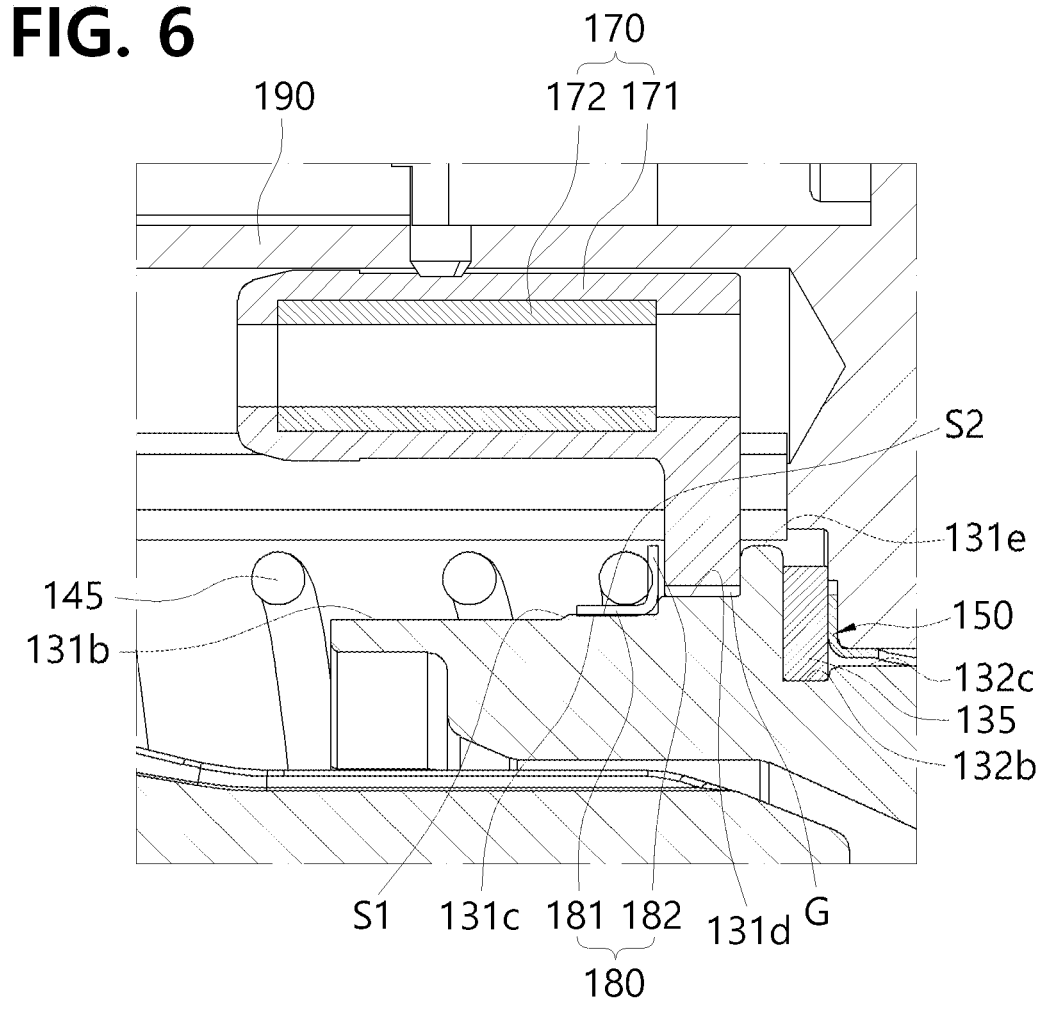
FIG. 6 is an enlarged view of part A of FIG. 5.
Figure 7:
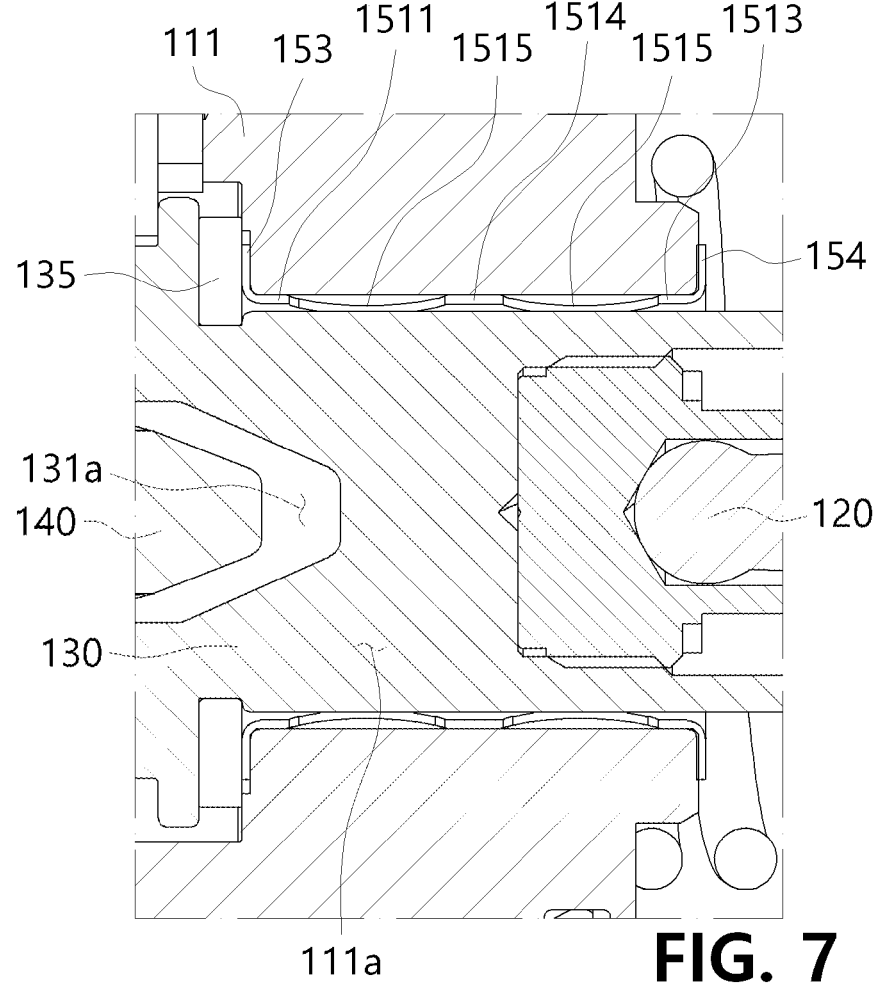
FIG. 7 is an enlarged view of part B of FIG. 5.
Figure 8:
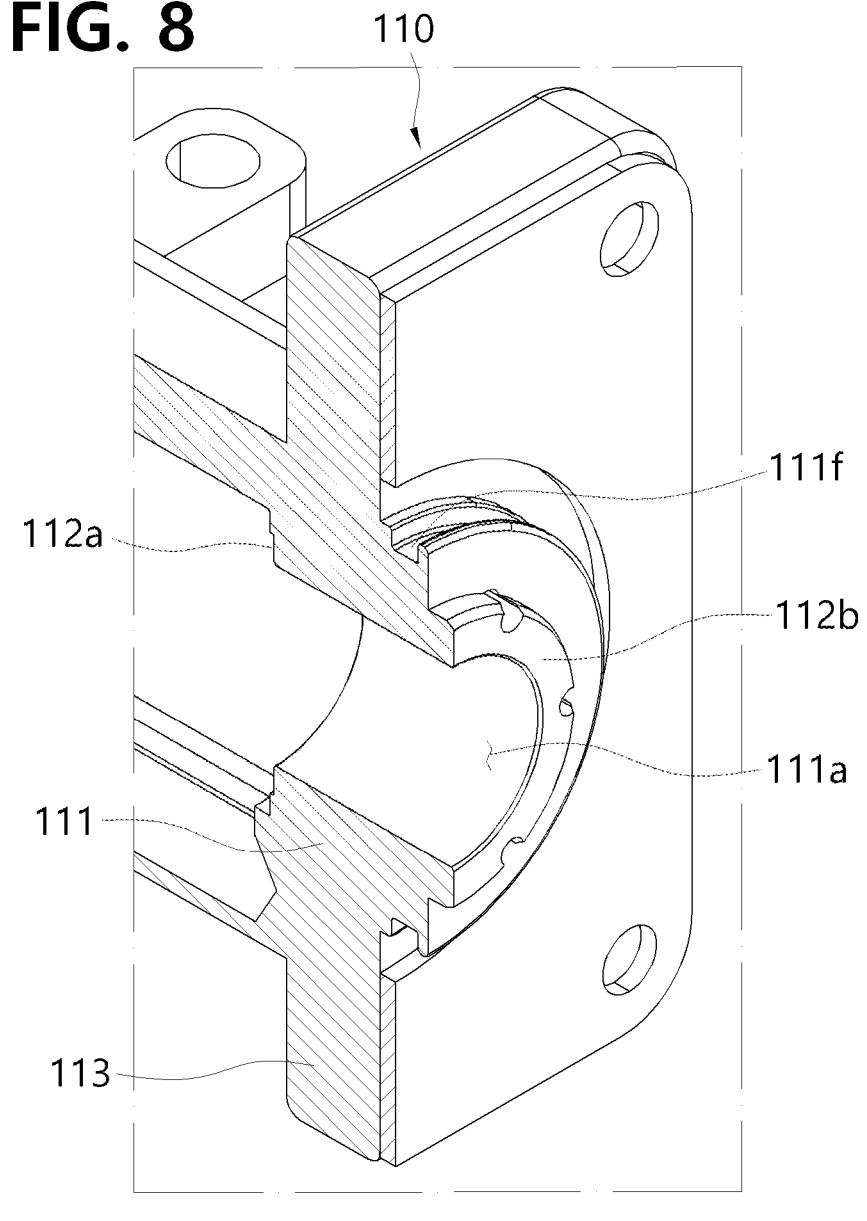
FIG. 8 is a longitudinal cross-sectional perspective view of a rear part of a housing of a pedal simulator according to an exemplary embodiment of the present disclosure.
Figure 9:
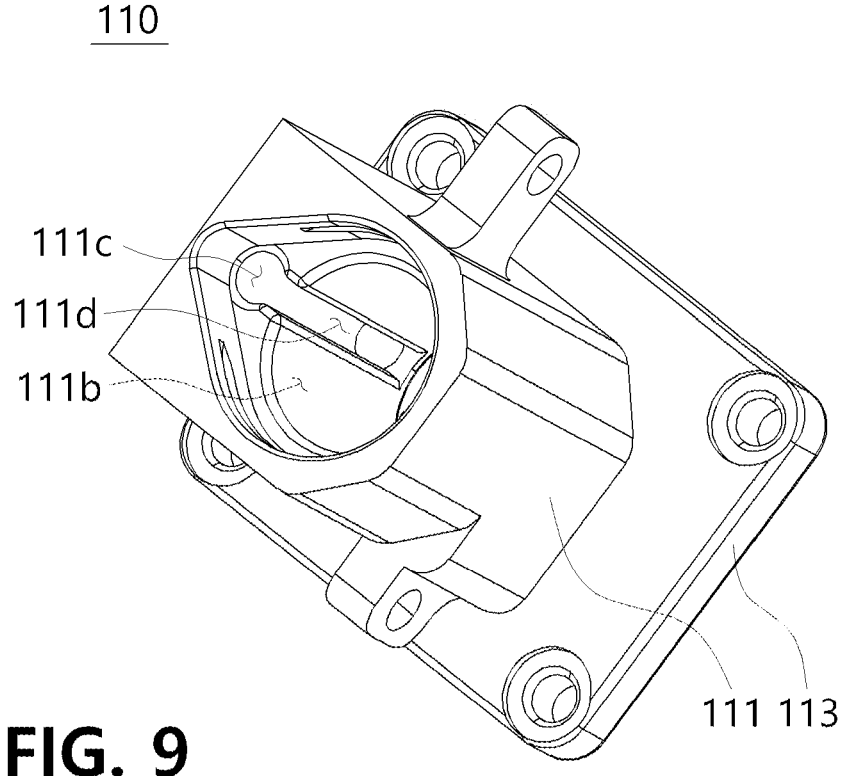
FIG. 9 is a front perspective view of a housing of a pedal simulator according to an exemplary embodiment of the present disclosure.
Figure 10:
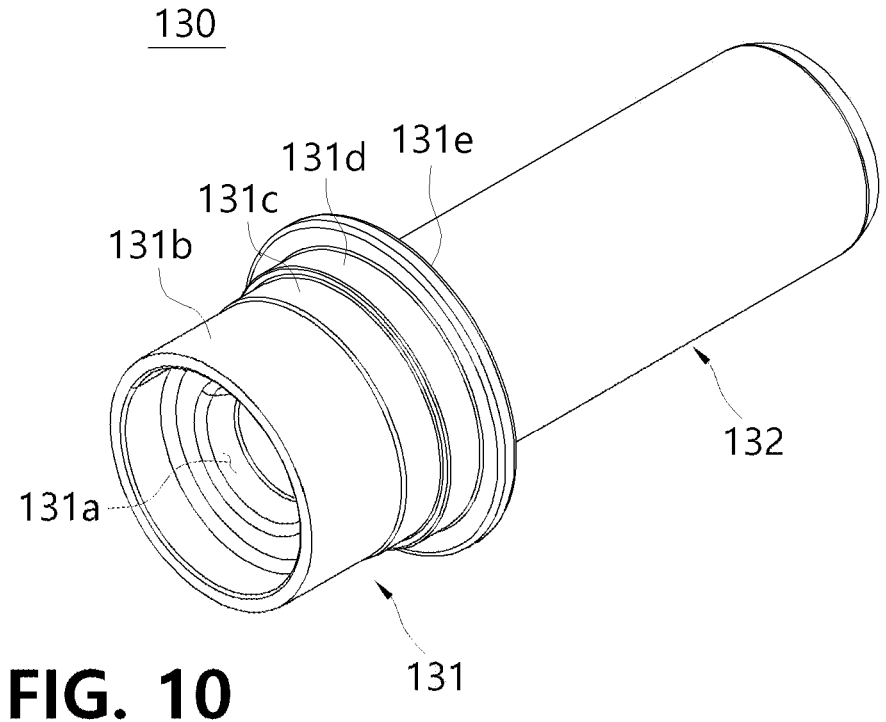
FIG. 10 is a front perspective view of a piston of a pedal simulator according to an exemplary embodiment of the present disclosure.

FIG. 2 is a perspective view of a pedal simulator according to an exemplary embodiment of the present disclosure. FIG. 3 is a perspective view of a pedal simulator according to an exemplary embodiment of the present disclosure with a longitudinal cross section of a housing cut away to expose it. FIG. 4 is an exploded perspective view of a pedal simulator according to an exemplary embodiment of the present disclosure. FIG. 5 is a longitudinal cross-sectional view of a pedal simulator according to an exemplary embodiment of the present disclosure. FIG. 6 is an enlarged view of part A of FIG. 5. FIG. 7 is an enlarged view of part B of FIG. 5. FIG. 8 is a longitudinal cross-sectional perspective view of a rear part of a housing of a pedal simulator according to an exemplary embodiment of the present disclosure. FIG. 9 is a front perspective view of a housing of a pedal simulator according to an exemplary embodiment of the present disclosure. FIG. 10 is a front perspective view of a piston of a pedal simulator according to an exemplary embodiment of the present disclosure.

Hereinafter, with respect to the relative position and direction, it will be described that a housing 110 is disposed in front of an input shaft 120. That is, the housing 110 side is described forward and the input shaft 120 side is described backward.

In addition, in relation to the direction of movement of the piston 130, the movement of the piston 130 from the input shaft 120 toward the housing 110 is defined as the forward direction, and the movement of the piston 130 from the housing 110 toward the input shaft 120 is defined as the backward direction.

Referring to FIGS. 2 to 10, the pedal simulator 100 according to an exemplary embodiment of the present disclosure may include a housing 110, an input shaft 120, a piston 130, a reaction force member 140, and a friction member 150.

The housing 110 is provided such that the piston 130, the reaction force member 140, the friction member 150, and the like are disposed.

The housing 110 includes a housing body 111.

A guide through hole 111a through which the piston 130 penetrates and is disposed is formed in the housing body 111. The guide through hole 111a may extend to have a predetermined length in the extension direction of the piston 130 to guide the piston 130 when the piston 130 moves forward or backward.

The guide through hole 111a may be disposed at a rear portion of the housing body 111.

In an embodiment of the present disclosure, a first space 111b and a second space 111c may be formed in the housing body 111.

The first space 111b is provided so that the piston 130 and the reaction force member 140 are disposed.

The first space 111b may be disposed in front of the guide through hole 111a and in communication with the guide through hole 111a. In an embodiment of the present disclosure, the first space 111b may be expanded to have an inner diameter larger than an inner diameter of the guide through hole 111a in front of the guide through hole 111a and extend forward.

The first space 111b may have a cylindrical shape. The first space 111b may extend in the front-rear direction within the housing body 111. In this case, the inner diameter of the first space 111b may be formed to correspond to the outer diameter of the piston 130. More specifically, the inner diameter of the first space 111b may have an inner diameter corresponding to the maximum outer diameter of a piston head 131 of the piston 130. Accordingly, forward or backward movement of the piston 130 in the first space 111b may be stably guided.

The second space 111c is formed side by side with the first space 111b and is provided such that the displacement member 170 is disposed therein. The second space 111c may have a cylindrical shape. The second space 111c may extend in the front-rear direction within the housing body 111. In more detail, the second space 111c may extend forward and backward in parallel with the first space 111b.

The inner diameter of the second space 111c may be formed to have a dimension corresponding to the displacement member 170. Accordingly, forward or backward movement of the displacement member 170 in the second space 111c may be stably guided.

Referring to FIG. 9, a long groove 111d may be disposed between the first space 111b and the second space 111c. That is, the first space 111b and the second space 111c may communicate with each other through the long groove 111d.

The displacement member 170 may be disposed while passing through the long groove 111d. More specifically, the displacement member 170 coupled to the piston 130 may pass through the long groove 111d and be disposed in the second space 111c.

Referring to FIGS. 2 to 5, the housing body 111 has a shape in which a front end is open. Accordingly, components such as the piston 130, the reaction force member 140, and the displacement member 170 may enter the housing body 111 through the front of the housing body 111 and be arranged therein. As described above, since the housing body 111 has an open front side, the pedal simulator 100 may be easily assembled.

In this regard, the pedal simulator 100 may further include a housing cover 110a disposed to cover the open front end of the housing body 111. In an embodiment of the present disclosure, the housing cover 110a may seal the opening of the front end of the housing body 111 and be coupled to the housing body 111.

For example, the housing cover 110a may be coupled to the housing body 111 by a key 110b placed in front of the housing cover 110a and fitted into a key groove formed on the inner surface of the opening of the front end of the housing body 111. In addition to this, the housing cover 110a may be coupled to the housing body 111 in various ways.

In an embodiment of the present disclosure, the housing 110 may further include an extension body 113. The extension body 113 is formed to extend from the housing body 111. For example, the extension body 113 may extend from the housing body 111 in a direction perpendicular to the extension direction of the piston 130.

A coupling member 200 for coupling the pedal simulator 100 to the vehicle (not shown) may pass through and be coupled to the extension body 113.

The input shaft 120 is connected to the pedal so as to move according to the displacement of the pedal of the vehicle. The input shaft 120 may be arranged to extend to the rear of the housing 110, for example, the housing body 111.

In an embodiment of the present disclosure, the input shaft 120 may connect the brake pedal 10 to the piston 130. The input shaft 120 may be connected to the brake pedal 10 to move forward or backward according to the operation of the brake pedal 10. More specifically, when the brake pedal 10 is stepped on by the driver of the vehicle, the input shaft 120 may move forward. In addition, when the pedal effort is released and the brake pedal 10 returns to the position before operation, the input shaft 120 may move backward.

At least a portion of the front side of the piston 130 is disposed inside the housing 110, for example, the housing body 111. The piston 130 may be connected to the input shaft 120 to move forward or backward according to the movement of the input shaft 120.

Referring to FIGS. 3 to 5 and 10, the piston 130 includes a piston head 131 and a piston body 132.

The piston head 131 is in contact with the reaction force member 140 and is disposed in the first space 111*b*. The piston head 131 is disposed in contact with the reaction force member 140 so as to compress the reaction force member 140 when the piston 130 moves forward. In other words, when the piston 130 moves forward, the piston head 131 receives a reaction force according to the compression of the reaction force member 140.

The piston head 131 may have a cylindrical shape. In addition, the piston head 131 may have a reaction force member groove 131*a* formed along the axial direction so that the reaction force member 140 is inserted therein. The reaction force member groove 131*a* may be formed to a predetermined depth along the longitudinal axis of the piston 130 at the front end of the piston head 131.

Referring to FIGS. 4 to 6 and 10, the piston head 131 may include a first outer diameter part 131*c*, a second outer diameter part 131*d*, and a third outer diameter part 131*c*.

The first outer diameter part 131*c* has a cylindrical shape having a first outer diameter. The first outer diameter part 131*c* may have a through hole forming a part of the reaction force member groove 131*a* along the central axis in the longitudinal direction. A ring-shaped member 180, which will be described later, may be coupled to the outer circumferential surface of the first outer diameter part 131*c*.

The second outer diameter part 131*d* has a second outer diameter greater than the first outer diameter and is disposed in rear of the first outer diameter part 131*c*. The second outer diameter part 131*d* may have a through hole forming a part of the reaction force member groove 131*a* along the central axis in the longitudinal direction.

The second outer diameter part 131*d* forms a support step S2 at a boundary with the first outer diameter part 131*c*. The ring-shaped member 180 may be supported by the support step S2.

The third outer diameter part 131*e* has a third outer diameter greater than the second outer diameter, protrudes radially outward, and is disposed in rear of the second outer diameter part 131*d*. The third outer diameter part 131*e* may have a through hole forming a part of the reaction force member groove 131*a* along the central axis in the longitudinal direction.

The third outer diameter part 131*e* may form a displacement member insertion groove G on the outer circumferential surface of the piston head 131 together with the ring-shaped member 180. In more detail, the third outer diameter part 131*e* of the piston head 131 may form a displacement member insertion groove G along the circumferential direction of the piston head 131 together with the ring-shaped member 180.

The displacement member 170 may be coupled to the displacement member insertion groove G formed by the third outer diameter part 131*e* and the ring-shaped member 180.

In an embodiment of the present disclosure, the piston head 131 may further include a fourth outer diameter part 131*b*.

The fourth outer diameter part 131*b* has a fourth outer diameter smaller than the first outer diameter and is disposed in front of the first outer diameter part 131*c*. The ring-shaped member 180 may enter the front side of the piston head 131 and be coupled to the first outer diameter part 131*c*, and the fourth outer diameter part 131*b* facilitates the ring-shaped member 180 to enter toward the first outer diameter part 131*c*.

An inclined portion S1 is formed between the fourth outer diameter part 131*b* and the first outer diameter part 131*c*. In this case, the inclined portion S1 may be formed in a form in which the outer diameter thereof gradually increases from the fourth outer diameter part 131*b* toward the first outer diameter part 131*c*. If the inclined portion S1 is formed in a form in which the outer diameter thereof gradually increases from the front to the rear, the entry from the fourth outer diameter part 131*b* to the first outer diameter part 131*c* may be smoothly guided when the ring-shaped member 180 is assembled.

The piston body 132 is connected to the piston head 131 and disposed to pass through the guide through hole 111*a*. It is connected to the rear of the piston head 131. The piston body 132 may have a predetermined outer diameter and may extend to the rear of the piston head 131.

The piston body 132 is connected to the input shaft 120. The piston body 132 may have a cylindrical shape.

Referring to FIG. 5, the piston body 132 may have an input shaft groove 132*a* formed to have a predetermined depth forward from the rear end along the longitudinal central axis.

In an embodiment of the present disclosure, the reaction force member groove 131*a* and the input shaft groove 132*a* do not communicate with each other.

The input shaft 120 is inserted and into the input shaft groove 132*a* and disposed. In more detail, a front portion of the input shaft 120 may be inserted into the input shaft groove 132*a* and disposed. The front sidewall of the input shaft groove 132*a* is disposed in contact with the front end of the input shaft 120, and when the input shaft 120 moves forward according to the operation of the brake pedal 10, the input shaft 120 presses the front sidewall of the input shaft groove 132*a*, and accordingly, the piston 130 may move forward.

As shown in FIG. 5, the piston body 132 has an extension 132*c* extending in a cylindrical shape with a predetermined outer diameter. The above-described input shaft groove 132*a* may be formed along the central axis in the longitudinal direction of the extension 132*c*.

In an embodiment of the present disclosure, the piston body 132 may further include a shaft diameter part 132*b* recessed radially inward from a front portion of the extension 132*c*. A support ring 135 may be coupled to the shaft diameter part 132*b*. The support ring 135 may prevent the rear portion of the piston head 131 from directly contacting the wall of the housing 110 and may serve as a buffer or the like.

The reaction force member 140 is disposed inside the housing 110 to be compressed according to the forward movement of the piston 130, and provides reaction force to the forward movement of the piston 130. The reaction force member 140 provides a force to resist the forward movement of the piston 130, and thus the driver of the vehicle may feel the pedal feeling.

The reaction force member 140 may have an arbitrary structure that provides an elastic restoring force that resists the forward movement of the piston 130. The reaction force member 140 may be made of a single material having elasticity.

In an embodiment of the present disclosure, the front end of the reaction force member 140 is supported by the housing cover 110*a*, and the rear end of the reaction force member 140 is supported by the piston 130. More specifically, the rear portion of the reaction force member 140 may be inserted into the reaction force member groove 131*a* of the piston head 131 and disposed. In this case, the rear end of the reaction force member 140 may be supported by a sidewall of the reaction force member groove 131*a*.

The pedal simulator 100 according to an exemplary embodiment of the present disclosure may further include a first additional reaction force member 143. The first additional reaction force member 143 is disposed to overlap the reaction force member 140 to provide resistance force when the piston 130 moves forward. For example, the first additional reaction force member 143 may be a spring disposed to be compressed when the piston 130 moves forward.

The first additional reaction force member 143 contributes to forming a pedal feeling together with the reaction force member 140. In addition, the first additional reaction force member 143 may also serve to reverse the piston 130 so that the pedal can return to its original position when the force of pressing the pedal is lost.

The pedal simulator 100 according to an exemplary embodiment of the present disclosure may further include a second additional reaction force member 145.

The second additional reaction force member 145 is disposed to overlap the piston body 132 disposed at the rear of the housing 110 and the input shaft 120 coupled to the piston body 132 to provide resistance force when the piston 130 moves forward.

In other words, the second additional reaction force member 145 may be disposed on the longitudinal central axis of the piston body 132 and the input shaft 120, and the piston body 132 and the input shaft 120 may be disposed to pass through the second additional reaction force member 145.

For example, the second additional reaction force member 145 may be a spring disposed to be compressed when the piston 130 moves forward.

The front end of the second additional reaction force member 145 may be supported by the rear side of the housing 110, and the rear end of the second additional reaction force member 145 may be supported by one side of the input shaft 120. In this case, the front end of the second additional reaction force member 145 may be supported by the rear outer portion of the housing body 111 adjacent to the guide through hole 111*a*.

The rear end of the second additional reaction force member 145 is supported by a fixing member 146 fixed to one side of the input shaft 120.

The fixing member 146 may be provided in a key shape, and may be inserted into and coupled to a coupling groove 121 formed on the outer circumferential surface of the input shaft 120.

The second additional reaction force member 145 is covered by a cover member 147 and is not exposed to the outside. The cover member 147 may be formed in a corrugated pipe shape so as to be folded when the second additional reaction force member 145 is compressed and unfolded when the second additional reaction force member 145 is stretched.

The front end of the cover member 147 is inserted into and supported by a coupling groove 111*f* formed at the rear side of the housing 110. In addition, the rear end of the cover member 147 has a through hole through which the input shaft 120 passes, and the periphery of the through hole may be inserted into and coupled to a coupling groove 122 formed on the outer circumferential surface of the input shaft 120.

Figure 11:
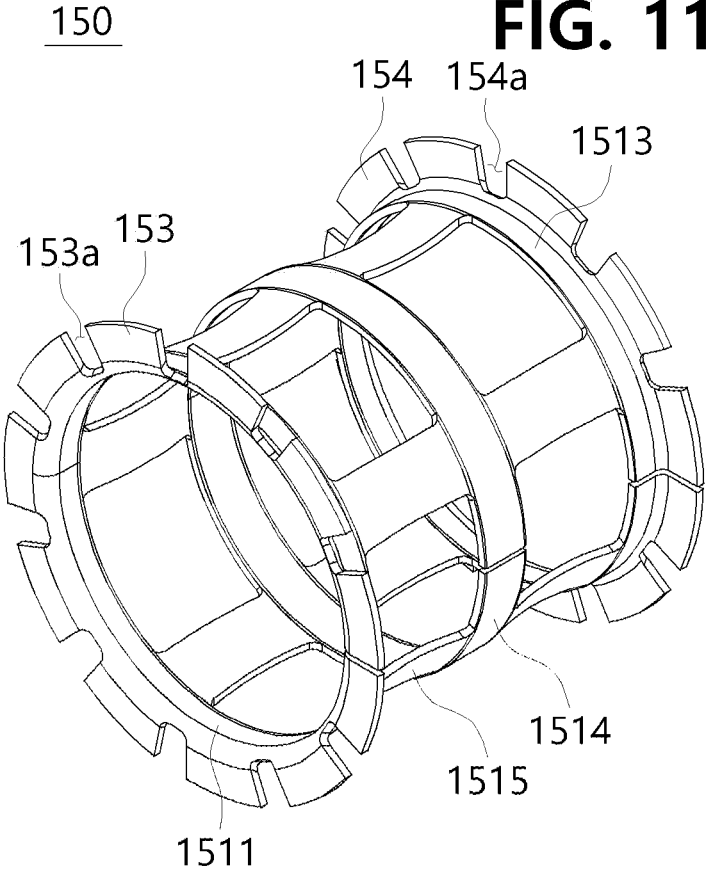
FIG. 11 is a perspective view of a friction member according to an exemplary embodiment of the present disclosure.

FIG. 11 is a perspective view of a friction member according to an exemplary embodiment of the present disclosure. Referring to FIGS. 3 to 5, 7, and 11, the friction member 150 is supported by the housing 110 to provide frictional force between itself and the piston 130 when the piston 130 moves forward or backward.

The friction member 150 may be formed to surround an outer circumferential surface of the piston 130. In this case, at least a portion of the friction member 150 is formed to be in contact with the outer circumferential surface of the piston 130.

The friction member 150 is supported by the guide through hole 111*a* of the housing 110. In this case, the friction member 150 provides frictional force between itself and the piston 130 moving forward or backward along the guide through hole 111*a* of the housing 110. Furthermore, the friction member 150 guides the movement of the piston 130 moving forward or backward along the guide through hole 111*a* of the housing 110.

The friction member 150 may be configured to include a friction member body 151, a first flange 153, and a second flange 154. An outer circumferential surface of the friction member body 151 is disposed in the guide through hole 111*a* of the housing 110.

At least a part of the friction member body 151 is in contact with the outer circumferential surface of the piston 130 that moves forward or backward through the guide through hole 111*a* to provide frictional force to the piston 130. This frictional force acts as a resistance force facing in a direction opposite to the moving direction of the piston 130.

The first flange 153 is formed to extend at the front side of the friction member body 151, and is caught and supported by the periphery (112*a* in FIG. 6) of the front inlet of the guide through hole 111*a*.

For example, the first flange 153 may be formed integrally extending from the front side of the friction member body 151, and may be formed by bending or folding a boundary region between the front side of the friction member body 151 and the first flange 153. In this case, the first flange 153 may have a cutout 153*a* formed in the circumferential direction to easily bend or fold with respect to the friction member body 151.

The second flange 154 is formed at the rear side of the friction member body 151, and is caught and supported by the periphery (112*b* in FIG. 6) of the rear inlet of the guide through hole 111*a*.

For example, the second flange 154 may be formed integrally extending from the rear side of the friction member body 151, and may be formed by bending or folding a boundary region between the rear side of the friction member body 151 and the second flange 154. In this case, the second flange 154 may have a cutout 154*a* formed in the circumferential direction to easily bend or fold with respect to the friction member body 151.

The first flange 153 and the second flange 154 are formed to cross each other at a predetermined angle with respect to the extension direction of the friction member body 151. For example, the first flange 153 and the second flange 154 may be formed to cross each other at an angle of 80 to 110 degrees with respect to the extension direction of the friction member body 151, but are not limited thereto.

The first flange 153 and the second flange 154 limit movement in the front-rear direction of the friction member body 151 with respect to the housing 110. In this case, the friction member body 151 may be effectively supported by the housing body 111 even when the piston 130 moves in the front-rear direction and frictional force is generated between the friction member body 151 and the piston 130.

Figure 12:
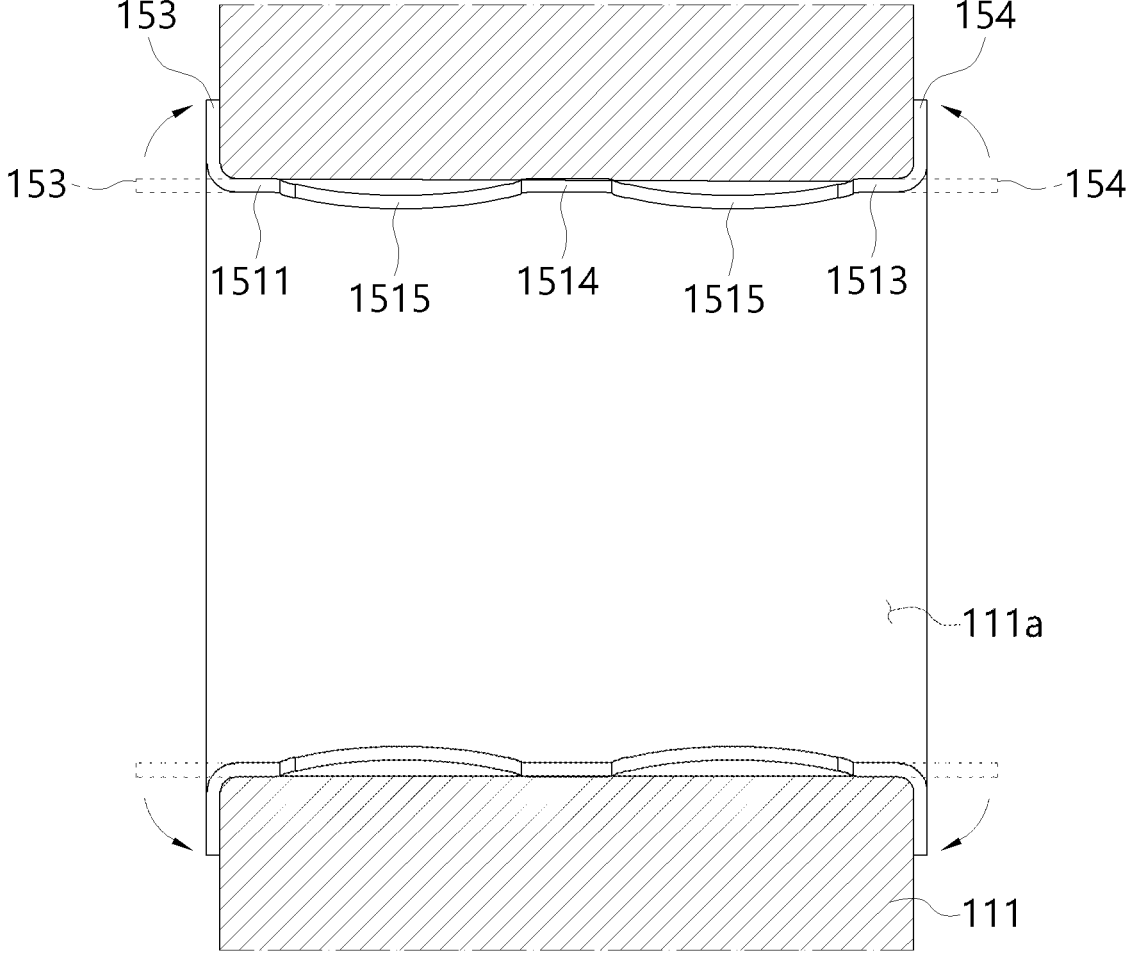
FIG. 12 is a view for explaining a coupling process between a friction member and a housing body.

The friction member 150 configured in this way may enter the guide through hole 111*a* and be disposed in a state where the first flange 153 and the second flange 154 are unfolded (see dotted lines) with respect to the friction member body 151 as shown in FIG. 12, and then may be supported by the housing body 111 by bending or folding the first flange 153 and the second flange 154 with respect to the friction member body 151.

For reference, FIG. 12 is a view for explaining a coupling process between a friction member and a housing body.

Referring to FIG. 11, the friction member body 151 according to an exemplary embodiment of the present disclosure may include a first body part 1511, a second body part 1513, a third body part 1514, and a contact body part 1515.

The first body part 1511 may be disposed in a front region of the guide through hole 111*a* and may have a ring shape surrounding the piston 130. In this case, at least a portion of an outer circumferential surface of the first body part 1511 may be formed to be in contact with an inner surface of the guide through hole 111*a*.

The second body part 1513 may be disposed in an inner rear region of the guide through hole 111*a* and may have a ring shape surrounding the piston 130. In this case, at least a portion of an outer circumferential surface of the second body part 1513 may be formed to be in contact with an inner surface of the guide through hole 111*a*.

The third body part 1514 may be disposed between the first body part 1511 and the second body part 1513 and may have a ring shape surrounding the piston 130. In this case, at least a portion of an outer circumferential surface of the third body part 1514 may be formed to be in contact with an inner surface of the guide through hole 111*a*.

The contact body part 1515 extends in the front-rear direction between the first body part 1511 and the third body part 1514 and between the second body part 1513 and the third body part 1514. In this case, one end of the contact body part 1515 may be fixed to and supported by the first body part 1511 or the third body part 1514, and the other end of the contact body part 1515 may be fixed to and supported by the second body part 1513.

At least a portion of the contact body part 1515 contacts an outer surface of the piston 130 to generate a frictional force between the contact body part 1515 and the piston 130. In this case, the contact body part 1515 may have a leaf spring structure concave in the central axis direction of the piston 130.

The contact body part 1515 may be in surface contact, line contact, or point contact with the outer surface of the piston 130.

Meanwhile, although not shown, in another embodiment, the friction member body may be configured to include the first body part, the second body part, and the contact body part without the third body part. In this case, the contact body part in the form of a leaf spring may be formed such that both sides thereof are fixed to supported by the first body part and the second body part, respectively.

Figure 13:
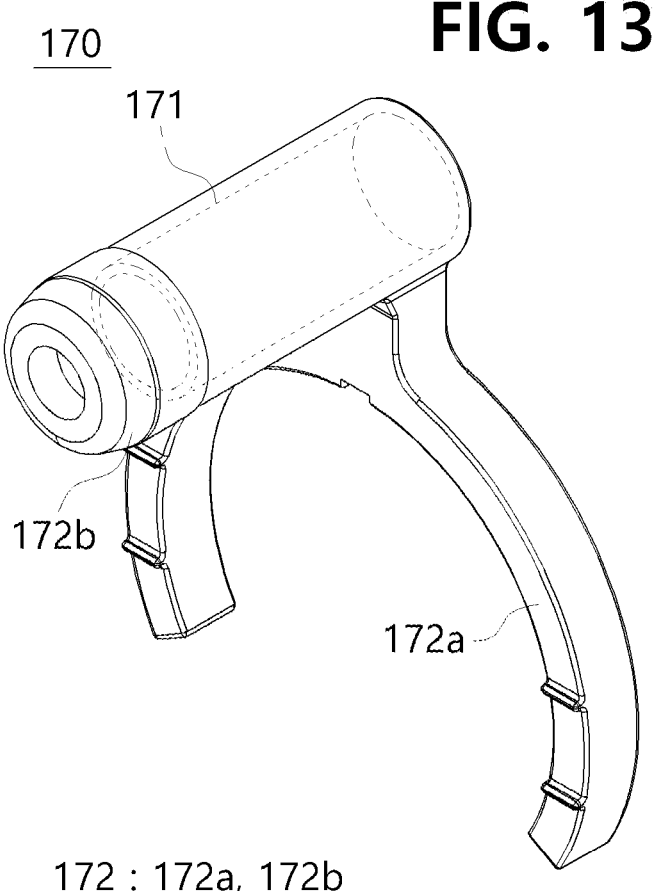
FIG. 13 is a front perspective view of a displacement member of a pedal simulator according to an exemplary embodiment of the present disclosure.

FIG. 13 is a front perspective view of a displacement member of a pedal simulator according to an exemplary embodiment of the present disclosure. Referring to FIGS. 4 to 6, and 13, the pedal simulator 100 according to an exemplary embodiment of the present disclosure may further include a displacement member 170, a ring-shaped member 180, and a sensor 190.

The displacement member 170 is connected to the piston 130 and disposed inside the housing 110, and is displaced together with the piston 130. By detecting a change in the position of the displacement member 170, the position of the piston 130 may be determined. Since the displacement of the piston 130 is made corresponding to the displacement of the input shaft 120 connected to a pedal of a vehicle, the displacement of the pedal may be identified through the positioning of the piston 130.

The displacement member 170 may include a magnet 171. As the displacement member 170 includes the magnet 171 in this way, the sensor 190 to be described later may detect a change in the magnetic field according to a change in the position of the displacement member 170.

The displacement member 170 may further include a holder 172 on which the magnet 171 is disposed and coupled to an outer circumferential surface of the piston 130. The holder 172 couples the magnet 171 to the piston 130 so that the magnet 171 moves forward or backward together according to the forward or backward movement of the piston 130.

Referring to FIGS. 4, 6, and 13, the holder 172 may include a coupling part 172*a* and a magnet arrangement part 172*b*.

The coupling part 172*a* is a part coupled to the piston 130. In an embodiment of the present disclosure, the coupling part 172*a* may be fitted into and coupled to the outer circumferential surface of the piston head 131 of the piston 130.

As described above, while the ring-shaped member 180 is coupled to the piston head 131, the ring-shaped member 180 and the third outer diameter part 131*e* of the piston head 131 form a displacement member insertion groove G along the circumferential direction of the piston head 131. The coupling part 172*a* may have an arc shape inserted into and coupled to the displacement member insertion groove G.

The magnet arrangement part 172*b* is provided such that the magnet 171 is arranged therein. The magnet arrangement part 172*b* is connected to the coupling part 172*a*.

In an embodiment of the present disclosure, the magnet arrangement part 172*b* may be formed of a cylinder-shaped member in which the magnet 171 is arranged. In more detail, the magnet arrangement part 172*a* may have an outer diameter corresponding to an inner diameter of the second space 111*c*.

The magnet arrangement part 172*b* may extend in the front-rear direction inside the second space 111*c*. In this case, the magnet arrangement part 172*b* may extend in a direction orthogonal to the arc-shaped coupling part 172*a*.

The ring-shaped member 180 is coupled to the piston 130 to form a displacement member insertion groove G through which the displacement member 170 may be coupled to the piston 130. The ring-shaped member 180 may have an inner diameter corresponding to the first outer diameter and may be fitted into and coupled to the first outer diameter part 131c.

Referring to FIGS. 4, 6, and 13, the ring-shaped member 180 has an inner diameter corresponding to the first outer diameter, is fitted into and coupled to the first outer diameter part 131c, is supported rearward by the support step S2, and forms a displacement member insertion groove G into which the displacement member 170 may be fitted and coupled together with the third outer diameter part 131c.

In an embodiment of the present disclosure, the ring-shaped member 180 may include a ring-shaped body 181 and a flange 182.

The ring-shaped body 181 has an inner diameter corresponding to the first outer diameter. The ring-shaped body 181 may be fitted into and coupled to the first outer diameter part 131c. In this case, the ring-shaped body 181 may enter the front side of the piston head 131 and be coupled to the first outer diameter part 131c.

As described above, the fourth outer diameter part 131b having the fourth outer diameter smaller than the first outer diameter of the first outer diameter part 131c is disposed in front of the first outer diameter part 131c of the piston head 131. Since the fourth outer diameter part 131b has an outer diameter smaller than an inner diameter of the ring-shaped body 181 of the ring-shaped member 180, it facilitates the ring-shaped body 181 to enter the first outer diameter part 131c.

In addition, an inclined portion S1 is formed between the fourth outer diameter part 131b and the first outer diameter part 131c, and the inclined portion S1 may have a shape in which the outer diameter gradually increases from the fourth outer diameter part 131b toward the first outer diameter part 131c. This configuration allows the ring-shaped body 181 to be smoothly guided from the fourth outer diameter part 131b to the first outer diameter part 131c when the ring-shaped member 180 is assembled.

The flange 182 protrudes radially outward from the ring-shaped body 181. The flange 182 may form a groove G into which the displacement member 170 may be fitted and coupled together with the third outer diameter part 131c.

The pedal simulator 100 according to an exemplary embodiment of the present disclosure forms a displacement member insertion groove G to which the displacement member 170 may be coupled by a combination of the ring-shaped member 180 and the third outer diameter part 131e of the piston head 131. That is, a combination of the ring-shaped member 180 and the third outer diameter part 131e provides a structure such as one that is formed by reducing the diameter of a portion of the piston head 131 radially inward.

This configuration allows the assembly of the pedal simulator 100 to be performed by placing the piston 130 in the first space 111b of the housing 110, seating the displacement member 170 on the piston head 131, and then fitting and coupling the ring-shaped member 180 to the piston head 131. Accordingly, it is easy to arrange the piston 130 and the displacement member 170 in the housing 110, and efficiency can be secured in terms of assembly and manufacturing.

Meanwhile, the flange 182 may be pressed by the first additional reaction force member 143. In other words, the rear of the first additional reaction force member 143 may be seated on the flange 182 to press the flange 182 rearward. The first additional reaction force member 143 presses the ring-shaped member 180 toward the support step S2 formed between the first outer diameter part 131c and the second outer diameter part 131d. Accordingly, the coupling state between the ring-shaped member 180 and the piston 130 may be stably maintained.

The sensor 190 is mounted to detect displacement of the displacement member 170. The sensor 190 may detect a change in the magnetic field according to forward or backward movement of the magnet 171 of the displacement member 170. For example, the sensor 190 may be a hall sensor.

The input shaft 120 and the piston 130 move forward or backward according to the displacement of the pedal of the vehicle, and the displacement member 170 moves forward or backward together according to the forward or backward movement of the piston 130. In this process, a change in the magnetic field occurs according to the displacement of the magnet 171 of the displacement member 170.

The sensor 190 may detect the position of the displacement member 170 by detecting the change in the magnetic field. Displacement (position) of the pedal of the vehicle may be measured based on the sensing information of the sensor 190.

The control of the vehicle may be performed according to the displacement (position) of the pedal of the vehicle determined as described above. For example, if the pedal is the brake pedal 10 mounted to the brake system of the vehicle, the magnitude of the braking force corresponding to the displacement (position) of the brake pedal 10 may be determined. The pump 30 generating the braking hydraulic pressure according to the determined magnitude of the braking force may generate the corresponding braking hydraulic pressure, and the braking hydraulic pressure may be supplied to the brake 50 mounted to each wheel W through the hydraulic circuit 40 of the vehicle.

Meanwhile, when the sensor 190 is used together with a separate external sensor, redundancy may be secured in relation to the detection of the displacement of the pedal of the vehicle.

The sensor 190 may be mounted in contact with the outer surface of the housing 110. In an embodiment of the present disclosure, the sensor 190 may be mounted in contact with the outer surface of the second space 111c of the housing 110.

Referring to FIG. 4, the sensor 190 may be fastened to the outer surface of the housing 110 through a bolt B. In addition, the sensor 190 may have a connection interface 190a for supplying power and transmitting sensing information.

Figure 14:
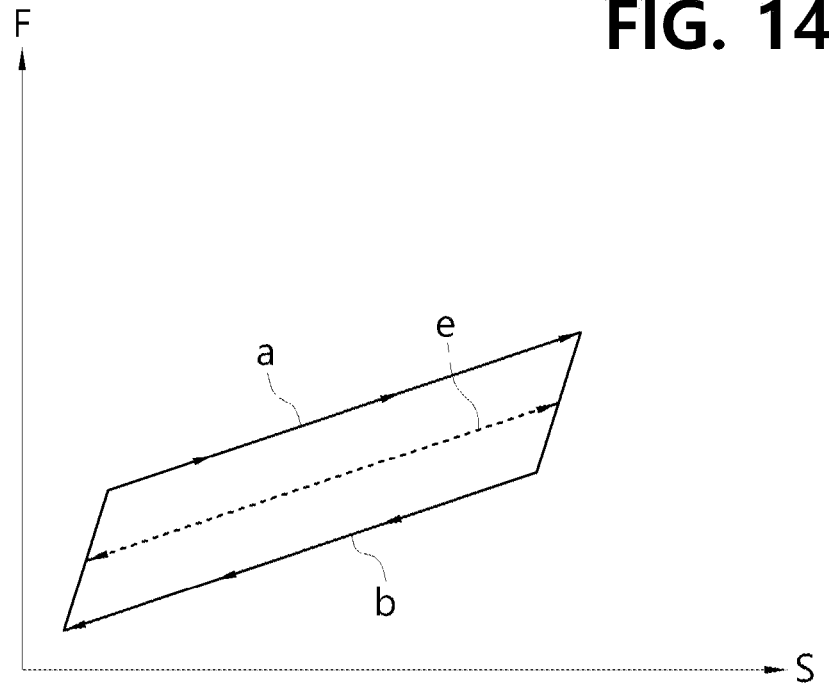
FIG. 14 is a graph illustrating a path of change in a reaction force with respect to an operation of a pedal when a pedal simulator according to an exemplary embodiment of the present disclosure is operated.

FIG. 14 is a graph illustrating a path of change in a reaction force with respect to an operation of a pedal when a pedal simulator according to an exemplary embodiment of the present disclosure is operated.

Referring to FIG. 14, when a pedal effort is applied to the pedal, the piston 130 moves forward.

In this case, the reaction force member 140, the first additional reaction force member 143, and the second additional reaction force member 145 provide a reaction force in the opposite direction to the forward movement of the piston 130. In addition, the friction member 150 generates a frictional force between itself and the piston 130 when the piston 130 moves forward, and the generated frictional force acts as a reaction force in the opposite direction to the forward movement of the piston 130.

Therefore, in an embodiment of the present disclosure, when the piston 130 moves forward, the reaction force provided by the reaction force member 140, the first additional reaction force member 143, the second additional reaction force member 145, and the friction member 150 is transmitted to the pedal through the input shaft 120.

As described above, when a pedal effort is applied to the pedal and the piston 130 moves forward, the path of change of the reaction force (F) transmitted to the pedal follows a first path (a) that has a relatively large reaction force compared to the stroke(S) of the pedal.

Meanwhile, when the pedal effort applied to the pedal is released, the piston 130 moves backward.

In this case, the elastic energy stored in the reaction force member 140, the first additional reaction force member 143, and the second additional reaction force member 145 may provide power for the piston 130 to move backward. In this case, the elastic energy stored in the reaction force member 140, the first additional reaction force member 143, and the second additional reaction force member 145 during the forward movement of the piston 130 may be provided as power for the piston 130 to move backward when the pedal effort to applied to the pedal is released.

In this case, the friction member 150 generates a frictional force between itself and the piston 130 when the piston 130 moves backward, and the generated frictional force acts as a reaction force in the opposite direction to the backward direction of the piston 130. In this case, the frictional force provided by the friction member 150 to the piston 130 acts in the opposite direction to the force provided by the reaction force member or the like to the piston 130.

Therefore, in an embodiment of the present disclosure, when the piston 130 moves backward, a force obtained by subtracting the frictional force generated between the friction member 150 and the piston 130 from the force provided to the piston 130 by the reaction force member 140, the first additional reaction force member 143, and the second additional reaction force member 145 is transmitted to the pedal through the input shaft 120.

As such, when the pedal effort is released from the pedal and the piston 130 moves backward, the path of change of the reaction force (F) transmitted to the pedal follows a second path (b) that has a relatively small reaction force compared to the stroke(S) of the pedal.

According to an exemplary embodiment of the present disclosure as described above, the friction member 150 provides a relatively large reaction force to the driver by generating a resistance force in a direction opposite to the movement direction of the piston 130, such as the reaction force member 140, when the piston 130 moves forward, and provides a relatively small reaction force to the driver by generating a resistance force in a direction opposite to the movement direction of the piston 130 unlike the reaction force member 140 when the piston 130 moves backward.

In this case, the hysteresis of the path of change of the reaction force with respect to the operation of the pedal may be increased. Accordingly, it is possible to improve the pedal feeling and reduce the fatigue of the driver.

For reference, in FIG. 14, the path (e) represents a path of change in the reaction force (F) transmitted to the pedal when the piston 130 moves forward or backward in the absence of the friction member 150.

According to the above configuration, the pedal simulator according to an aspect of the present disclosure allows the driver to feel a natural and stable pedal feeling through a friction member arranged to provide resistance to the piston moving forward or backward according to the pedal displacement.

The pedal simulator according to an aspect of the present disclosure improves the pedal feeling and reduces the driver's fatigue through a friction member that increases the hysteresis of the path of change in reaction force according to the pedal stroke.

It should be understood that the effects of the present disclosure are not limited to the above-described effects, and include all effects inferable from a configuration of the invention described in detailed descriptions or claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

The invention claimed is:

1. A pedal simulator, comprising:
a housing;
a piston, at least a front portion of which is arranged inside the housing and connected to a pedal of a vehicle, and moving forward or backward according to the movement of the pedal;
a reaction force member arranged inside the housing to be compressed in accordance with the forward movement of the piston and providing a reaction force to the forward movement of the piston; and
a friction member supported by the housing to provide frictional force between itself and the piston when the piston moves forward or backward,
wherein the friction member is formed to surround an outer circumferential surface of the piston, at least a portion of the friction member being in contact with the outer circumferential surface of the piston,
wherein the housing comprises a housing body in which a guide through hole through which the piston penetrates and is disposed, and
wherein the friction member comprises a friction member body formed to be arranged inside the guide through hole, at least a portion of the friction member body being in contact with the outer circumferential surface of the piston, wherein the friction member body comprises:
a first body part arranged in a front region of the guide through hole and having a ring shape surrounding the piston;
a second body part arranged in a rear region of the guide through hole and having a ring shape surrounding the piston; and
a contact body part extending in the front-rear direction between the first body part and the second body part and configured to generate frictional force by contacting at least a portion thereof with an outer surface of the piston.

2. The pedal simulator of claim 1, wherein the contact body part has a leaf spring structure concave in the central axis direction of the piston.

3. The pedal simulator of claim 1,
wherein the contact body part is provided in the plural number, and
wherein each of the plurality of contact body part is spaced apart from each other in the circumferential direction of the piston.

4. The pedal simulator of claim 1,
wherein the friction member body further comprises:

a third body part arranged between the first body part and the second body part and having a ring shape surrounding the piston, and wherein the contact body part extends in the front-rear direction between the first body part and the third body part and between the second body part and the third body part, and at least a portion of the contact body part is in contact with an outer circumferential surface of the piston.

5. The pedal simulator of claim 1, wherein the friction member further comprises:

a first flange that is formed to extend at a front side of the friction member body, and is caught and supported by a periphery of a front inlet of the guide through hole; and a second flange that is formed to extend at a rear side of the friction member body, and is caught and supported by a periphery of a rear inlet of the guide through hole.

6. The pedal simulator of claim 5, wherein the first flange and the second flange are formed to cross each other at a predetermined angle with respect to the extension direction of the friction member body.

7. The pedal simulator of claim 1, wherein a first space communicating with the guide through hole and arranged in front of the guide through hole is formed in the housing body, and wherein the reaction force member is arranged in the first space.

8. The pedal simulator of claim 7, wherein the piston comprises:

a piston head in contact with the reaction force member and arranged in the first space; and a piston body connected to the piston head and arranged through the guide through hole.

9. The pedal simulator of claim 7, further comprising a first additional reaction force member arranged to overlap the reaction force member to provide resistance force when the piston moves forward.

10. The pedal simulator of claim 1, further comprising a second additional reaction force member arranged to overlap a portion of the piston to provide resistance force when the piston moves forward.

11. The pedal simulator of claim 10, wherein a front end of the second additional reaction force member is supported by a rear side of the housing body, and a rear end of the second additional reaction force member is coupled to and supported by one side of the input shaft connecting the pedal and the piston.

12. A pedal simulator configured to provide pedal effort to a pedal of a vehicle, the pedal simulator comprising:

a housing;

a piston, at least a front portion of which is arranged inside the housing and connected to a pedal of a vehicle, and moving forward or backward according to the movement of the pedal; and a friction member supported by the housing to provide frictional force between itself and the piston when the piston moves forward or backward, wherein the friction member is formed to surround an outer circumferential surface of the piston, at least a portion of the friction member being in contact with the outer circumferential surface of the piston, wherein the housing comprises a housing body in which a guide through hole through which the piston penetrates and is disposed, and wherein the friction member comprises a friction member body formed to be arranged inside the guide through hole, at least a portion of the friction member body being in contact with the outer circumferential surface of the piston, wherein the friction member body comprises:

a first body part arranged in a front region of the guide through hole and having a ring shape surrounding the piston;

a second body part arranged in a rear region of the guide through hole and having a ring shape surrounding the piston; and a contact body part extending in the front-rear direction between the first body part and the second body part and configured to generate frictional force by contacting at least a portion thereof with an outer surface of the piston.

13. The pedal simulator of claim 12, wherein the contact body part has a leaf spring structure concave in the central axis direction of the piston.

14. The pedal simulator of claim 12, wherein the contact body part is provided in the plural number, and wherein each of the plurality of contact body part is spaced apart from each other in the circumferential direction of the piston.

15. A vehicle, comprising:

a vehicle body; and a pedal simulator mounted to the vehicle body and configured to provide pedal effort to a pedal of the vehicle, wherein the pedal simulator includes:

a housing;

a piston, at least a front portion of which is arranged inside the housing and connected to a pedal of a vehicle, and moving forward or backward according to the movement of the pedal;

a reaction force member arranged inside the housing to be compressed in accordance with the forward movement of the piston and providing a reaction force to the forward movement of the piston; and a friction member supported by the housing to provide frictional force between itself and the piston when the piston moves forward or backward, wherein the friction member is formed to surround an outer circumferential surface of the piston, at least a portion of the friction member being in contact with the outer circumferential surface of the piston, wherein the housing comprises a housing body in which a guide through hole through which the piston penetrates and is disposed, and wherein the friction member comprises a friction member body formed to be arranged inside the guide through hole, at least a portion of the friction member body being in contact with the outer circumferential surface of the piston, wherein the friction member body comprises:

a first body part arranged in a front region of the guide through hole and having a ring shape surrounding the piston;

a second body part arranged in a rear region of the guide through hole and having a ring shape surrounding the piston; and a contact body part extending in the front-rear direction between the first body part and the second body part and configured to generate frictional force by contacting at least a portion thereof with an outer surface of the piston.

16. The vehicle of claim 15, wherein the contact body part has a leaf spring structure concave in the central axis direction of the piston.

17. The vehicle of claim 15,
wherein the contact body part is provided in the plural number, and
wherein each of the plurality of contact body part is spaced apart from each other in the circumferential direction of the piston.

18. The vehicle of claim 15,
wherein the friction member body further comprises:
  a third body part arranged between the first body part and the second body part and having a ring shape surrounding the piston, and
  wherein the contact body part extends in the front-rear direction between the first body part and the third body part and between the second body part and the third body part, and at least a portion of the contact body part is in contact with an outer circumferential surface of the piston.

19. The vehicle of claim 15,
wherein the friction member further comprises:
  a first flange that is formed to extend at a front side of the friction member body, and is caught and supported by a periphery of a front inlet of the guide through hole; and
  a second flange that is formed to extend at a rear side of the friction member body, and is caught and supported by a periphery of a rear inlet of the guide through hole.

20. The vehicle of claim 15,
wherein a first space communicating with the guide through hole and arranged in front of the guide through hole is formed in the housing body, and
wherein the reaction force member is arranged in the first space.

* * * * *